United States Patent
Kaikkonen et al.

(10) Patent No.: US 12,052,690 B2
(45) Date of Patent: Jul. 30, 2024

(54) DETERMINING RADAR ALLOCATION IN WIRELESS COMMUNICATION SYSTEM

(71) Applicant: Nokia Technologies Oy, Espoo (FI)

(72) Inventors: Jorma Kaikkonen, Oulu (FI); Kari Pajukoski, Oulu (FI); Benny Vejlgaard, Gistrup (DK); Marco Maso, Issy les Moulineaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 412 days.

(21) Appl. No.: 17/627,712

(22) PCT Filed: Aug. 15, 2019

(86) PCT No.: PCT/EP2019/071936
§ 371 (c)(1),
(2) Date: Jan. 17, 2022

(87) PCT Pub. No.: WO2021/028057
PCT Pub. Date: Feb. 18, 2021

(65) Prior Publication Data
US 2022/0232524 A1    Jul. 21, 2022

(51) Int. Cl.
H04W 72/02 (2009.01)
H04L 5/00 (2006.01)
H04W 72/0446 (2023.01)
H04W 72/23 (2023.01)

(52) U.S. Cl.
CPC ........... *H04W 72/02* (2013.01); *H04L 5/0048* (2013.01); *H04W 72/0446* (2013.01); *H04W 72/23* (2023.01)

(58) Field of Classification Search
None
See application file for complete search history.

(56) References Cited

U.S. PATENT DOCUMENTS

| 10,681,567 | B2 * | 6/2020 | Kovacs | H04W 4/70 |
| 10,970,942 | B2 * | 4/2021 | Zhang | H04W 4/44 |
| 2010/0173586 | A1 * | 7/2010 | McHenry | H04W 16/14 |
| | | | | 455/62 |
| 2015/0063146 | A1 * | 3/2015 | Sadek | H04K 3/224 |
| | | | | 370/252 |

(Continued)

FOREIGN PATENT DOCUMENTS

| WO | 2013/081525 A1 | 6/2013 |
| WO | 2017/188730 A1 | 11/2017 |

(Continued)

OTHER PUBLICATIONS

"3rd Generation Partnership Project; Technical Specification Group Radio Access Network; Study on New Radio access technology; 60 GHz unlicensed spectrum (Release 14)", 3GPP TR 38.805, V14.0.0, Mar. 2017, pp. 1-17.

(Continued)

*Primary Examiner* — Lonnie V Sweet
(74) *Attorney, Agent, or Firm* — Robert P. Michal, Esq.; Carter, DeLuca & Farrell LLP

(57) ABSTRACT

There is provided determining one or more resources on a wireless medium of a wireless communication system for a radar allocation; and transmitting resource allocation information indicating the radar allocation.

1 Claim, 6 Drawing Sheets

502 determining one or more resources on a wireless medium of a wireless communication system for a radar allocation 504 transmitting resource allocation information indicating the radar allocation

(56) References Cited

U.S. PATENT DOCUMENTS

| | | | |
|---|---|---|---|
| 2015/0296413 A1* | 10/2015 | Sadek | H04W 16/14 |
| | | | 375/348 |
| 2016/0080101 A1 | 3/2016 | Naeini et al. | |
| 2017/0006493 A1 | 1/2017 | Chincholi et al. | |
| 2017/0048721 A1* | 2/2017 | Sun | H04W 16/14 |
| 2017/0223712 A1* | 8/2017 | Stephens | H04W 28/18 |
| 2018/0092093 A1* | 3/2018 | Ramaswamy | H04B 1/58 |
| 2019/0115985 A1* | 4/2019 | Bechta | H04B 17/318 |
| 2020/0036487 A1* | 1/2020 | Hammond | H04L 5/0012 |
| 2020/0068632 A1* | 2/2020 | Kato | H04W 40/22 |
| 2020/0107249 A1* | 4/2020 | Stauffer | H04W 48/14 |
| 2020/0120458 A1* | 4/2020 | Aldana | H04W 4/08 |
| 2021/0105631 A1* | 4/2021 | Green | H04W 16/14 |
| 2022/0256519 A1* | 8/2022 | Jeon | G01S 13/582 |
| 2023/0184883 A1* | 6/2023 | Li | G01S 7/023 |
| | | | 342/59 |

FOREIGN PATENT DOCUMENTS

| | | |
|---|---|---|
| WO | 2018/097817 A1 | 5/2018 |
| WO | 2018/210427 A1 | 11/2018 |

OTHER PUBLICATIONS

"Revised SID on Study on NR beyond 52.6GHz", 3GPP TSG RAN Meeting #82, RP-182861, Intel Corporation, Dec. 10-13, 2018, 4 pages.

"3rd Generation Partnership Project; Technical Specification Group Radio Access Network; Study on requirements for NR beyond 52.6 GHz (Release 16)", 3GPP TR 38.807, V0.2.0, Jun. 2019, 67 pages.

Khawar et al., "Spectrum sharing between S-band radar and LTE cellular system: A spatial approach", IEEE International Symposium on Dynamic Spectrum Access Networks (DYSPAN), Apr. 1-4, 2014, pp. 7-14.

Shajaiah et al., "Spectrum Sharing Approach between Radar and Communication Systems and its Impact on Radar's Detectable Target Parameters", IEEE 81st Vehicular Technology Conference (VTC Spring), May 11-14, 2015, 6 pages.

Naparstek et al., "Hybrid Opportunistic Radar Over Long Term Evolution Networks", IEEE Radar Conference (RadarCon), May 10-15, 2015, pp. 1551-1554.

Guerci et al., "RAST: Radar as a subscriber technology for wireless spectrum cohabitation", IEEE Radar Conference, May 19-23, 2014, pp. 1130-1134.

Paul et al., "Survey of RF Communications and Sensing Convergence Research", IEEE Access, vol. 5, Dec. 13, 2016, pp. 252-270.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"3rd Generation Partnership Project; Technical Specification Group Radio Access Network; NR; Physical layer procedures for data (Release 15)", 3GPP TS 38.214, V15.5.0, Mar. 2019, pp. 1-103.

"IEEE 802.11ad", Wikipedia, Retrieved on Jan. 12, 2022, Webpage available at : https://en.wikipedia.org/wiki/IEEE_802.11ad.

"IEEE 802.11ay", Wikipedia, Retrieved on Jan. 12, 2022, Webpage available at : https://en.wikipedia.org/wiki/IEEE_802.11ay.

Thoma et al., "Cooperative Passive Coherent Location: a Promising 5g Service to Support Road Safety", arXiv, Jul. 10, 2019, pp. 1-7.

International Search Report and Written Opinion received for corresponding Patent Cooperation Treaty Application No. PCT/EP2019/071936, dated Apr. 3, 2020, 10 pages.

* cited by examiner

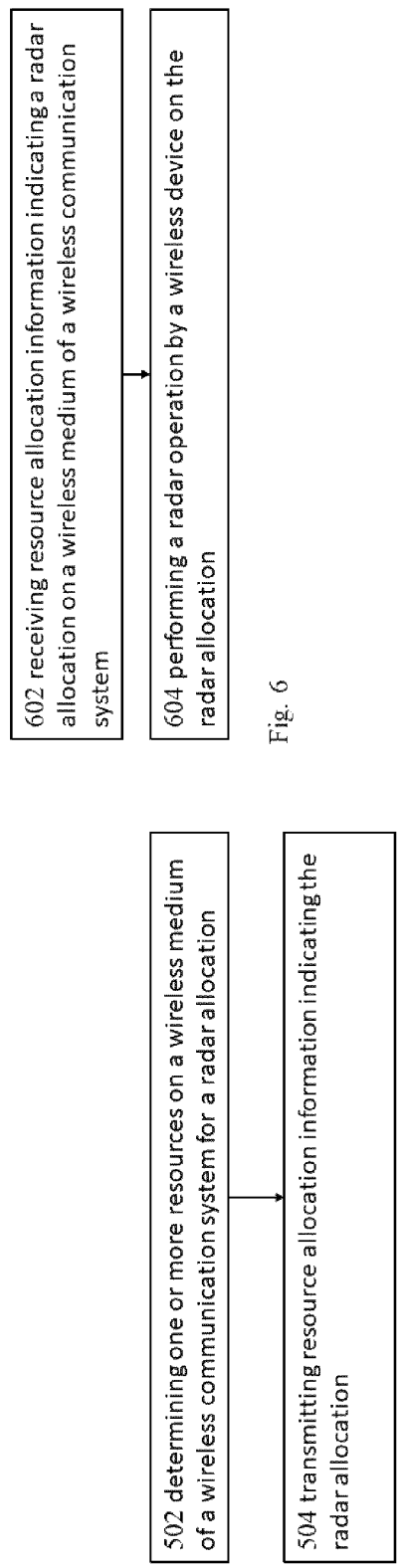

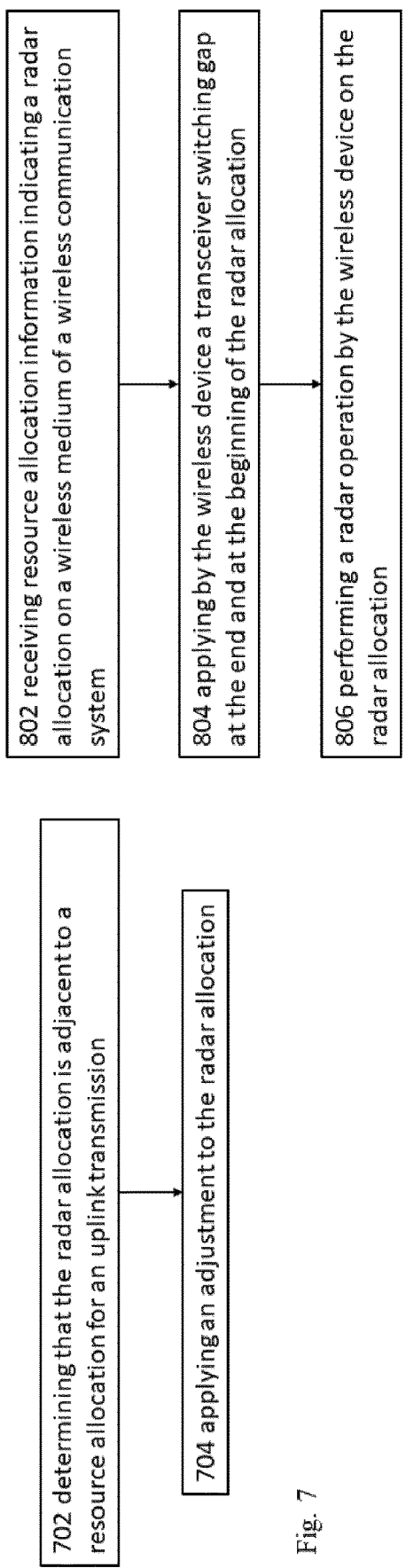

Fig. 7

802 receiving resource allocation information indicating a radar allocation on a wireless medium of a wireless communication system 804 applying by the wireless device a transceiver switching gap at the end and at the beginning of the radar allocation 806 performing a radar operation by the wireless device on the radar allocation

Fig. 8

702 determining that the radar allocation is adjacent to a resource allocation for an uplink transmission 704 applying an adjustment to the radar allocation

| D | D | D | D | X | U | U | U | S | S |
---
902

Fig. 9

DETERMINING RADAR ALLOCATION IN WIRELESS COMMUNICATION SYSTEM

RELATED APPLICATION

This application was originally filed as PCT Application No. PCT/EP2019/071936 on Aug. 15, 2019, which is hereby incorporated in its entirety.

TECHNICAL FIELD

The present invention relates to determining a radar allocation in a wireless communication system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communications systems provide connections to User Equipment (UE) in their coverage areas. UE having radar capability are capable of radar operation. Radar operation comprises transmission and reception of sounding signals. If radar capabilities are introduced to the UE, radar operations performed by UE close to each other can cause interference to each other as well as to communications in the wireless communication system particularly, when frequency band used for the radar at least partly overlaps with the frequency band of the wireless communication system.

Existing resources of the UE for wireless communications cannot be used for implementing the radar capabilities without interruptions to operations of the UE in the wireless communication system.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According a first aspect, there is provided an access node comprising: a processor; and a transceiver connected with the processor, wherein the processor is configured to:
  determine one or more resources on a wireless medium of a wireless communication system for a radar allocation; and
  control the transceiver to transmit resource allocation information indicating the radar allocation.

According a second aspect, there is provided a wireless device comprising:
  a processor; and a transceiver connected to the processor, wherein the processor is configured to:
  control the transceiver to receive resource allocation information indicating a radar allocation on a wireless medium of a wireless communication system; and
  control the transceiver to perform a radar operation by the wireless device on the radar allocation.

According to a third aspect there is provided a method comprising:
  determining one or more resources on a wireless medium of a wireless communication system for a radar allocation; and
  transmitting resource allocation information indicating the radar allocation.

According to a fourth aspect there is provided a method comprising:
  receiving resource allocation information indicating a radar allocation on a wireless medium of a wireless communication system; and
  performing a radar operation by a wireless device on the radar allocation.

According to a fifth aspect there is provided a computer program comprising computer readable program code means adapted to perform at least the following:
  determining one or more resources on a wireless medium of a wireless communication system for a radar allocation; and
  transmitting resource allocation information indicating the radar allocation According to a sixth aspect there is provided a computer program comprising computer readable program code means adapted to perform at least the following:
  receiving information indicating a radar allocation on a wireless medium of a wireless communication system; and
  performing a radar operation by the wireless device on the radar allocation.

According to a seventh aspect there is provided a computer program comprising computer readable program code means adapted to perform at least the following:
  receiving resource allocation information indicating a radar allocation on a wireless medium of a wireless communication system; and
  performing a radar operation by a wireless device on the radar allocation According to an eighth aspect, there is provided a computer program according to an aspect embodied on a computer readable medium.

According to one or more further aspects, embodiments according to the first, second, third, fourth, fifth, sixth, seventh and eighth aspect comprise one or more features of:
  the radar allocation is determined by a slot configuration for a radio frame of the wireless communication system, wherein the slot configuration comprises one or more slots or symbols dedicated for the radar allocation
  the slot configuration supports distribution of sensing time of radar signals during the radar allocation between the wireless device and the wireless communication system
  the slot configuration comprises slots or symbols dedicated for a sounding operation
  the radar allocation comprises a gap in a communication allocation on the wireless medium
  the resource allocation information is transmitted to the wireless device or received by the wireless device in a broadcast system information message, a dedicated configuration message, blank resource signaling and/or a downlink control information message
  the radar allocation is associated with one or more restrictions comprising at least one of a transmission power limitation, a restriction for spatial directions and/or a use of allocated frequencies.

At least some embodiments enable co-existence of a radar application and a communication application at a wireless device of a wireless communication system.

BRIEF DESCRIPTION OF THE DRAWINGS

For a more complete understanding of example embodiments of the present invention, reference is now made to the following descriptions taken in connection with the accompanying drawings in which:

FIGS. 5, 6, 7 and 8 illustrate examples methods in accordance with at least some embodiments of the present invention; and FIG. 9 illustrates an example of a radar allocation in accordance with at least some embodiments of the present invention.

DETAILED DESCRIPTION OF SOME EXAMPLE EMBODIMENTS

Figure 1:
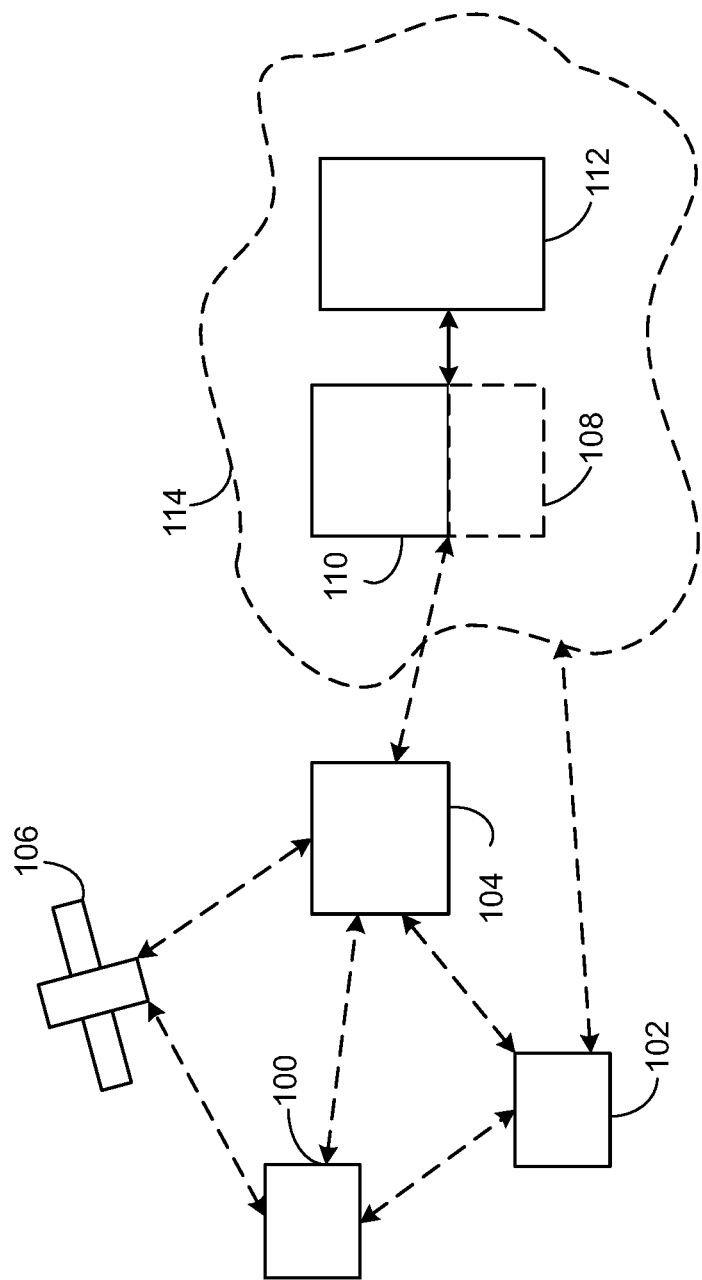
FIG. 1 shows a part of an exemplifying wireless communications access network in accordance with at least some embodiments of the present invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In connection with radar operation for a wireless device in a wireless communication system, there is provided determining one or more resources on a wireless medium of the wireless communication system for a radar allocation, and transmitting resource allocation information indicating the radar allocation. In this way co-existence of a radar application and a communication application at the wireless device may be supported.

A radar operation of a wireless device in a wireless communication system may be performed on the same frequencies that are utilized by the wireless communication system for wireless communications, whereby interference due to uncoordinated radar operation may be a problem for the communications performed in the wireless communication system. Moreover, the frequencies for radar operation may be on unlicensed frequency bands, whereby the radar may cause interference also to other systems as well. On the other hand successful radar operation may be prevented by the wireless communication system or other systems operating on the same frequency with the radar operations.

Operating frequencies for the radar beyond 52.6 GHz and above 60 GHz are particularly interesting since containing relatively large spectrum allocations and large bandwidths, and being suitable for numerous applications of radar operations in wireless devices. Examples of applications comprise at least: performing a radar operation by a wireless device for detecting nearby soft-tissues for transmission power back-off; surveying the surrounding environment to optimize beam alignment procedures; enabling collision avoidance mechanisms in Virtual Reality and/or Augmented Reality and Vehicle to anything (V2X) use cases (including drones); detecting user interaction gestures.

A radar operation comprises at least one of transmitting and sensing sounding signals, i.e. radar signals. A radar operation may be performed within a field of view of a radar or a device supporting radar operations, e.g. a wireless device. The field of view of the radar may be defined by a direction transmitting the radar signal from the radar. The transmitted radar signal reaches an object located within the field of view of the radar after a time δ of a propagation delay has passed and the radar signal is reflected back from the object to the radar. The radar receives the reflected radar signal after 2δ from transmitting the radar signal. If no objects are located within the field of view, the transmitted signal is not reflected back. The time offset between the transmitted and the received reflected signal, the round-trip time, determines the distance to the reflected object. A distance to the object may be expressed by $$D = c\frac{T_R}{2}, \quad (1)$$

where D is the distance, c is speed of light and $T_R$ is the round-trip time from transmitting the radar signal to receiving the radar signal. The radar operation is capable of detecting objects in the field of view from a minimum distance, $d_{min}$, and up to a maximum distance, $d_{max}$, from the radar. Then, a propagation delay will follow $$\frac{d_{min}}{c} \le \delta \le \frac{d_{max}}{c}, \quad (2)$$

where c is speed of light and δ is the propagation delay for the radar signal to reach an object within the field of view. Accordingly, the field of view of the radar satisfies formula (2). A sampling frequency for radar operation on the communication resource may be defined by $$\frac{2d_{min}}{c} + T \le T_R \le \frac{2d_{max}}{c} + T, \quad (3)$$

where T is the duration of the radar signal, $T_R$ is the round-trip time, $d_{min}$ a minimum distance for detecting objects within the field of view and $d_{max}$ a maximum distance for detecting objects within the field of view. The communication resource may be at frequencies in the order of the several GHz. In an example, a sampling rate of a 4 GHz provides detecting objects at the minimum distance, $d_{min}$, of 3.75 cm. The ranging resolution can be further increased by using a higher sampling rate.

Examples of radar signals comprise sequences that are contiguous in frequency and based on Zadoff Chu (ZC)-, m- or gold sequence. Because all of those sequence families already exist in NR UE, radar signals based on ZC-, m- or gold sequence may use an existing code generator of the NR UE. Moreover, the ZC-, m- or gold sequences have very low cross correlation properties, allowing the simultaneous presence of multiple radar signals in time. For example, in the case of ZC sequence, UE may select a root sequence randomly or root index can be linked to a signaled radar Reference Signal (RS) identifier (ID). Furthermore, cyclic shift may be utilized depending on the radar's range in order to maximize the number of sequences and to minimize a collision probability for the sequences. The minimization of the collision probability is an important target when UE requests a radar slot by using a dedicated random access preamble, since multiple UEs may receive a grant at the same time. In practice, the 2 GHz radar sequence consists of at least 2000 samples resulting in almost the same number of root sequences (nearest prime number). If cyclic shift "domain" is used in addition to root sequences, the total number of sequences may be up to around 100000, in turn resulting in very small collision probability.

An example of a radar signal is a Sounding Reference Signal (SRS) used for UL sounding by UE in 5G New Radio (NR). The properties of the SRS among all NR UL RS have always comb signal in frequency (e.g utilized only every 2th, 4th, 8th . . . frequency pin), and results in respective repetition in time domain and therefore reduced accuracy of radar, making the SRS is suitable for short range radar operation. It has low cross correlation and high auto correlation properties, hence detecting signal copies will be simple and interference from other radar signals will be minimum. Furthermore, the generation of SRS signal is already supported by current UEs, whereby signaling an SRS ID to the UE is sufficient for using the SRS for radar signal. It should be appreciated that other signal with similar properties may be used for radar signal.

A communication allocation may comprise one or more resources, e.g. physical units, of a wireless medium controlled by the wireless communication system. The communication allocation may be allocated by the communication system for one or more data transmissions. A radar allocation may comprise one or more resources, e.g. physical units, of the wireless medium controlled by the wireless communication system which are determined by the wireless communication system for a radar operation. In an example, the radar allocation may comprise physical units that are not utilized for data transmissions. Resources of the wireless medium and also the radar allocation may be associated with one or more restrictions. Examples of the restrictions comprise a transmission power limitation, a restriction for spatial directions and/or a use of allocated frequencies.

In an example a physical unit may be a resource block or resource unit defined by a time slot and a sub-carrier frequency in accordance with an Orthogonal Frequency Division Multiple Access (OFDMA) Channel Access (CA) method. On the other hand, a resource block may be defined on the wireless medium in accordance with another CA method such as Frequency Division Multiple Access (FDMA) and Time Division Multiple Access (TDMA).

A wireless device for communication in a wireless communication system may be capable of radar operation as well as communications in the wireless communication system. In and the wireless device may comprise a radar application for performing the radar operation and a communication application for performing the communications in the wireless communication system.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 1904) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 1906 in the mega-constellation may cover several satellite-enabled network entities that create on-ground cells. The on-ground cells may be created through an on-ground relay node 1904 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 3:
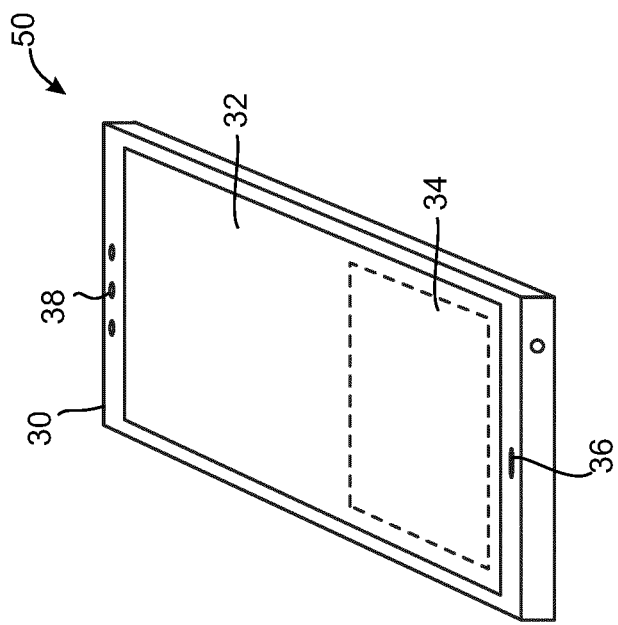
FIG. 3 shows an apparatus in accordance with at least some embodiments of the present invention.
Figure 2:
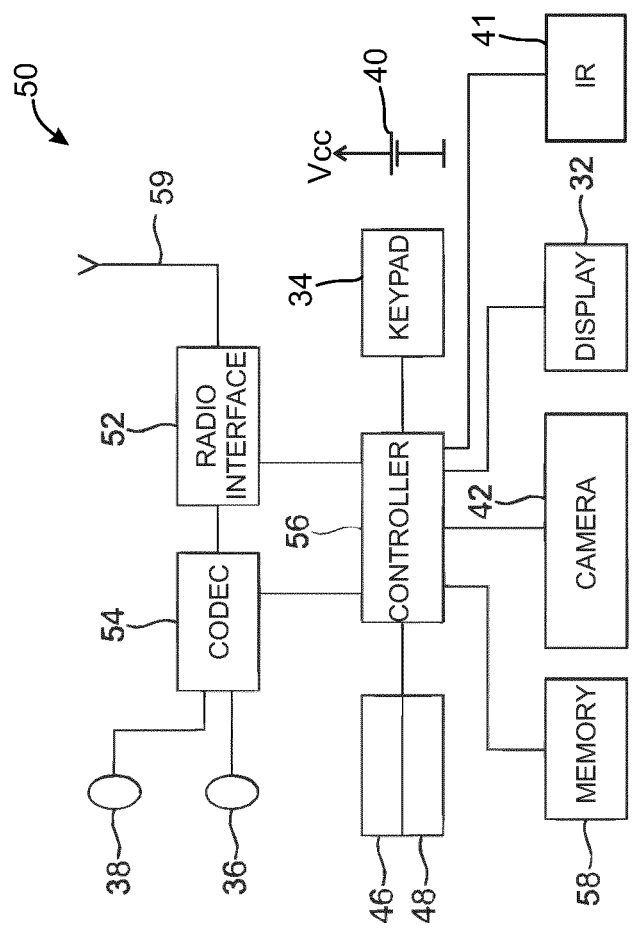
FIG. 2 shows a block diagram of an apparatus in accordance with at least some embodiments of the present invention.

The following describes in further detail suitable apparatus and possible mechanisms for implementing some embodiments. In this regard reference is first made to FIG. 2 which shows a schematic block diagram of an exemplary apparatus or electronic device 50 depicted in FIG. 3, which may incorporate a transmitter according to an embodiment of the invention.

The electronic device 50 may for example be a wireless device, mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 (also can be called as radio frequency module) connected to the controller and suitable for generating wireless communication signals for example for communication with a cellular communications network, a wireless communications system or a wireless local area network. The radio interface circuitry 52 includes one or more transmitters and one or more receivers. In this case, the transmitter and the receiver can be configured to one entity such as a radio transceiver. The apparatus 50 may further comprise an antenna 59 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 4:
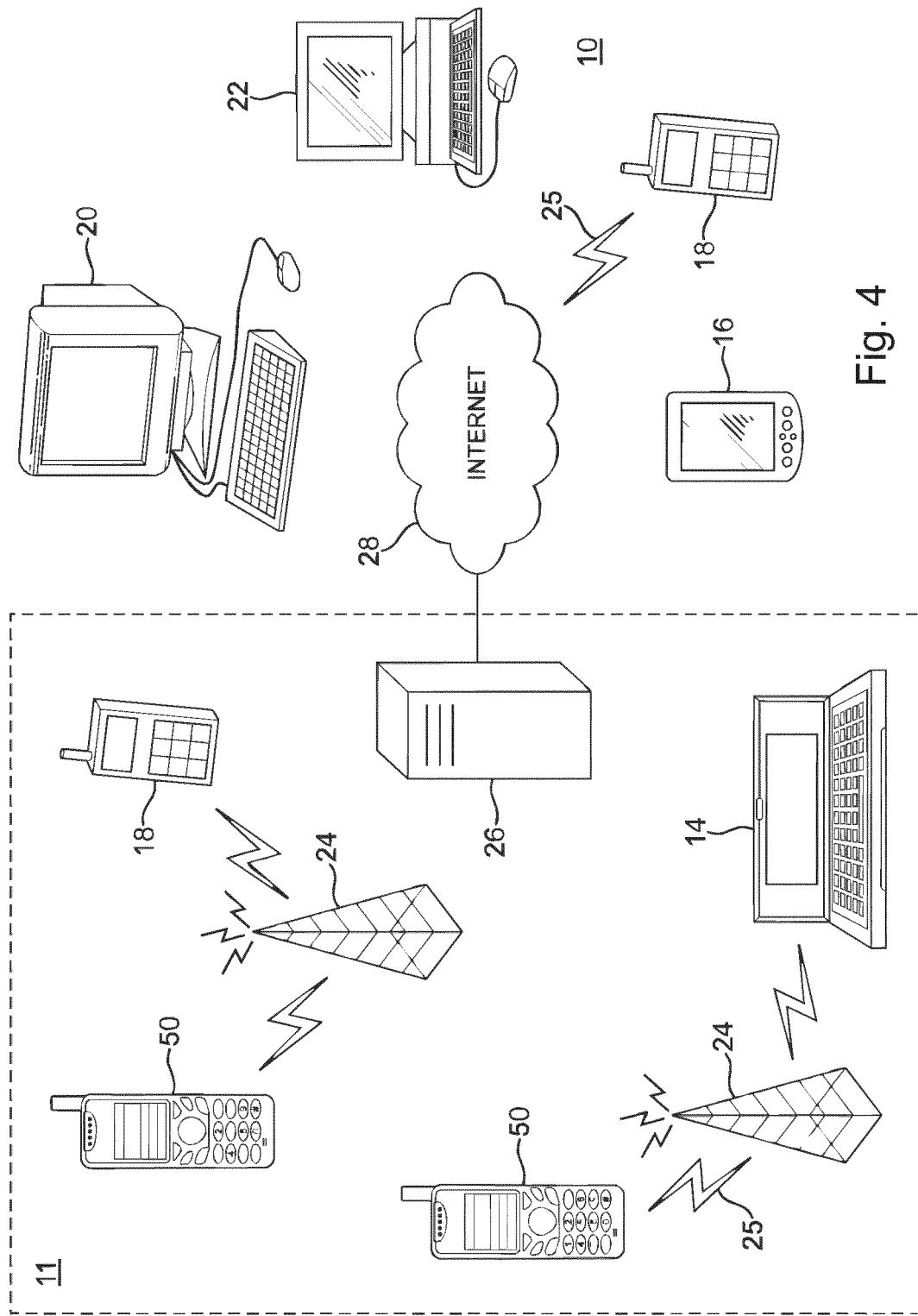
FIG. 4 shows an example of an arrangement for wireless communications comprising a plurality of apparatuses, networks and network elements.

With respect to FIG. 4, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 4 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

In an example in accordance with at least some embodiments the communications of the communications devices may comprise uplink transmissions and/or downlink transmissions of data. The uplink transmissions may be performed from a wireless device to the wireless communication system, e.g. an access node, and the downlink transmissions may be performed from the wireless communication system to the wireless device. The uplink transmissions may be performed on an uplink shared channel, e.g. a Physical Uplink Shared Channel (PUSCH). The PUSCH may be transmitted by the wireless device on the basis of a grant received on a downlink control channel, e.g. a Physical Downlink control Channel (PDCCH). The downlink transmissions may be performed on a downlink shared channel, e.g. a Physical Downlink Shared Channel (PDSCH). Release 15 specifications of the 3GPP may be referred to for examples PUSCH and PDSCH procedures.

The downlink and uplink transmissions may be organized into frames, e.g. a radio frame. In an example, each frame may be of 10 ms duration and divided into subframes of 1 ms duration. Each subframe may be further divided into multiple Orthogonal Frequency Division-Multiplexing (OFDM) symbols. The OFDM symbols may be arranged to slots within each subframe. In an example, the radio frame may include 10 subframes. One subframe may include two consecutive slots of 14 symbols with 30 kHz sub-carrier spacing. Accordingly, the radio frame may in total include 20 slots.

FIGS. 5, 6, 7 and 8 illustrate examples methods in accordance with at least some embodiments of the present invention. Referring to FIG. 5, a method is provided for co-existence of a radar application and a communication application at a wireless device of a wireless communication system. The method may be performed by a network entity of the wireless communication system, for example an entity of a radio access network, such as by a gNB, communicating with the wireless device, e.g. UE.

Phase 502 comprises determining one or more resources on a wireless medium of a wireless communication system for a radar allocation.

Phase 504 comprises transmitting resource allocation information indicating the radar allocation.

In an example, in phase 504 the resource allocation may be transmitted to the wireless device.

In an embodiment, phase 504 comprises that the resource allocation information is transmitted to the wireless device in a broadcast system information message, a dedicated configuration message, blank resource signaling and/or a downlink control information message.

In an example, phase 504 comprises that a broadcast system information message, a dedicated configuration message or blank resource signaling may be used to indicate the wireless device one or more resources for a radar operation. A downlink control information message following the indication of the resources may indicate the wireless device to perform the radar operation. For this purpose the downlink control message may comprise information for indicating that the radar operation should be performed. In this way signaling of the resources and control of the radar operation may be provided.

In an example the blank resource signaling in phase 504 may comprise a RateMatchpattern signaling on a Physical Dedicated Shred Channel (PDSCH). The RateMatchpattern signaling may be performed in accordance with TS 38.214 Sections 5.1.4.1 and 5.1.4.2.

In an example, in phase 504, the downlink control message may be Downlink Control Information (DCI) carried on a Physical dedicated Control Channel.

In an example, in phase 504, the dedicated configuration message may be a Radio Resource Control Protocol (RRC) message or a Medium Access Control message (MAC).

In an embodiment, phase 504 comprises that the radar allocation is associated with one or more restrictions comprising at least one of a transmission power limitation, a restriction for spatial directions and/or a use of allocated frequencies. In this way the use of the radar allocation and possible interference caused by use of the radar allocation may be controlled.

In an embodiment, phase 502 comprises that the radar allocation comprises one or more gaps in a communication allocation on the wireless medium. In this way interference caused by a radar operation performed during the gap to communications in the wireless communication system may be avoided. In an example, the gaps may be slots and/or symbols of a slot configuration. It should be appreciated that a gap in a communication allocation may be free from communications of the wireless communication system or the gap may identify a resource of the wireless medium to be used for a radar operation. Accordingly, in the latter case the gap may not necessarily be from communications of the wireless communication system.

In an embodiment, phase 502 comprises that the radar allocation is determined by a slot configuration for a radio frame of the wireless communication system. In this way a radar allocation may be communicated to the wireless device in connection with the slot configuration.

Referring to FIG. 6, a method is provided for co-existence of a radar application and a communication application at a wireless device of a wireless communication system. The method may be performed by the wireless device, for example UE, communicating with an entity of a radio access network, such as a gNB, of the wireless communication system.

Phase 602 comprises receiving resource allocation information indicating a radar allocation on a wireless medium of a wireless communication system.

Phase 604 comprises performing a radar operation by the wireless device on the radar allocation.

In an embodiment, phase 602 comprises that the resource allocation information is received to the wireless device in a broadcast system information message, a dedicated configuration message, blank resource signaling and/or a downlink control information message.

In an example phase 602 comprises that a broadcast system information message, a dedicated configuration message or blank resource signaling may be used to indicate the wireless device one or more resources for a radar operation. A downlink control information message following the indication of the resources may indicate the wireless device to perform the radar operation. For this purpose the downlink control message may comprise information for indicating that the radar operation should be performed. Accordingly, if the downlink control message does not indicate the radar operation, the wireless device may not perform the radar operation. In this way signaling of the resources and control of the radar operation may be provided.

In an embodiment, phase 602 comprises that the radar allocation comprises one or more gaps in a communication allocation on the wireless medium. In this way interference caused by a radar operation performed during the gap to communications in the wireless communication system may be avoided. In an example, the gaps may be slots and/or symbols of a slot configuration. It should be appreciated that a gap in a communication allocation may be free from communications of the wireless communication system or the gap may identify a resource of the wireless medium to be used for a radar operation. Accordingly, in the latter case the gap may not necessarily be from communications of the wireless communication system.

In an embodiment, phase 602 comprises that the radar allocation is determined by a slot configuration for a radio frame of the wireless communication system. In this way a radar allocation may be communicated to the wireless device in connection with the slot configuration. In an example, in phase 602, the blank resource signaling may comprise a RateMatchpattern signaling in an RRC message on a Physical Dedicated Shred Channel (PDSCH). The RateMatchpattern signaling may be performed in accordance with TS 38.214 Sections 5.1.4.1 and 5.1.4.2.

In an example, in phase 602, the downlink control message may be Downlink Control Information (DCI) carried on a Physical Dedicated Control Channel (PDCCH).

In an embodiment, phase 604 comprises that the radar allocation is associated with one or more restrictions comprising at least one of a transmission power limitation, a restriction for spatial directions and/or a use of allocated frequencies. Then, the radar operations may be adjusted on the basis of the restrictions and adjusted the radar operations may be performed. In this way the use of the radar allocation and possible interference caused by use of the radar allocation may be controlled.

In an example, the restrictions may be applicable to the whole radar allocation or a part of the radar allocation. Alternatively or additionally, the restrictions may be specific to a cell of the wireless communication system.

Referring to FIG. 7 a method is described for applying a restriction for a radar application co-existing with a communication application at a wireless device of a wireless communication system. The method may be performed by the wireless device or a network entity of the wireless communication system, for example an entity of a radio access network, such as by a gNB, communicating with the wireless device, e.g. UE, in connection with one or more phases of the method of FIG. 6.

Phase 702 comprises determining that the radar allocation is adjacent to a resource allocation for an uplink transmission.

Phase 704 comprises applying an adjustment to the radar allocation. In this way the wireless device may be caused to restrict use of the radar allocation such that interference caused by a radar operation during the radar allocation may be avoided to communications performed in the wireless communication system.

In an example, phase 704 comprises that the adjustment causes the wireless device to control timing of one or more transmissions of radar signals during the radar allocation. In an example, the adjustment may cause that transmissions of the radar signals may be restricted during the radar allocation. Examples of the adjustments comprise at least a timing offset and a timing advance. In an example the timing offset or the timing advance may be applied to the beginning and/or to the end of the radar allocation to restrict a time during which a radar signal may be transmitted by the wireless device during the radar allocation.

In an example, in phase 704 information indicating the adjustment, e.g. a timing offset and a timing advance, may be delivered to the UE in UE dedicated signaling or broadcast signaling. The information indicating the adjustment may be delivered to the UE together with the radar allocation or by separate signaling. Examples of the signaling comprise at least a broadcast system information message, a dedicated configuration message, blank resource signaling and/or a downlink control information message. For example, the timing advance may depend on the UE location in a cell coverage area (e.g. distance to gNB). In this context, the applied timing advance to adjust the radar allocation could be provided through broadcast signaling by the cell connected to the UE. A restriction to transmission power of the UE may be applied to prevent interference from radar transmission by the UE propagating too far out of the cell coverage area.

In an example, phase 702 comprises that one or more slots of the radar allocation are determined to be adjacent to a slot for an uplink transmission. Then, applying an adjustment to the radar allocation in accordance with phase 704 provides provides that a radar operation, e.g. sounding, during the slots of the radar allocation may be restricted in time.

Referring to FIG. 8 a method is described for adjusting transceiver and different transmit timing instants on a resource of a wireless medium. The method may be performed by a wireless device, for example UE, communicating with an entity of a radio access network, such as a gNB, of the wireless communication system.

Phase 802 comprises receiving resource allocation information indicating a radar allocation on a wireless medium of a wireless communication system.

Phase 804 comprises applying by the wireless device a transceiver switching gap at the end and at the beginning of the radar allocation.

Phase 806 comprises performing a radar operation by the wireless device on the radar allocation.

In this way, a transceiver of the wireless device may be used for both a radar application and a communication application in the wireless device.

In an example phase 804 may comprise that the switching gap is an RX/TX switching gap. The switching gap may be define a time period of the radar allocation reserved for switching an operation mode of the transceiver between a receiving operation mode, i.e. RX mode, and a transmitting operation mode, TX mode. Accordingly, the switching gap may be a time period for switching from RX mode of the transceiver to TX mode of the transceiver or vice versa. During the switching gap, radar operation on the radar allocation is not performed. Accordingly, operation modes of the transceiver may comprise at least the TX mode and the RX mode. In this way, the use of the same transceiver may be supported for both the radar allocation and for one or more communication allocations on the wireless medium. Accordingly, if an operation mode of the transceiver is different on the radar allocation than on the communication allocation adjacent to the radar allocation, a need to switch the operation mode of the transceiver may be determined and the switching gap may be applied in accordance with phase 806.

Figure 9:
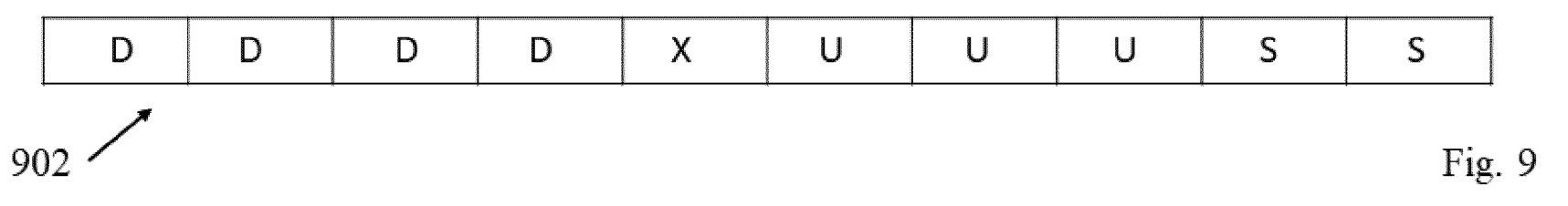

FIG. 9 illustrates an example of a radar allocation in accordance with at least some embodiments of the present invention. The radar allocation is determined by a slot configuration 902 for a radio frame of the wireless communication system, wherein the slot configuration comprises one or more slots 'S' dedicated for the radar allocation. In this way the slot configuration may be used for indicating available resource for radar operation.

In an example the slot configuration 902 comprises a radar allocation and a communication allocation for communication of data on a wireless medium of a wireless communication system. The communication allocation may be an allocation of one or more slots for a data transmission on a wireless medium of the wireless communication system. In this way a wireless device of the wireless communication system may receive the radar allocation together with the communication allocation.

In an example, the slots 'S' dedicated for the radar allocation may be adjacent to one or more other slots for one or more communication allocations. The slots for communication allocations may be arranged to precede and/or to succeed the radar allocation. Examples of the other slots comprise a downlink slot 'D', an uplink slot 'U' and a flexible slot. The downlink slot may be a communication allocation for a downlink data transmission. The uplink slot may be a communication allocation for an uplink data transmission. The flexible slot may be a communication allocation for both an uplink data transmission and a downlink data transmission.

In an example, a slot of the slot configuration 902 may comprise symbols. Symbols of the uplink data transmission are used for uplink data transmission, symbols of the downlink data transmission are used for downlink data transmission. Symbols of the flexible slot may be shared between uplink and downlink data transmissions. For example, a part, e.g. a half, of the symbols of the flexible slot may be used for an uplink transmission and another part of the symbols may be used for a downlink data transmission.

In an embodiment, the slot configuration 902 supports distribution of sensing time of radar signals during the radar allocation between the wireless device and the wireless communication system. In an example, at least a part of the slots or symbols of a radar allocation may be defined for sensing by the wireless device and another part of the slots or symbols of the radar allocation may be defined for sensing by the wireless communication system, e.g. a gNB. In this, way both the wireless device and the wireless communication system may be used for an active radar operation.

In an embodiment, the slot configuration 902 comprises slots or symbols dedicated for a sounding operation. In an example, the slots or symbols of a radar allocation may be defined for sounding by the wireless device or by the wireless communication system, e.g. a gNB. In this, way both the wireless device and the wireless communication system may be used for the sounding operation.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device, a gNB or a wireless communication system, it would be appreciated that the invention as described above may be implemented as a part of any apparatus, or a wireless network comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method of supporting radar operation, comprising:
determining one or more resources on a wireless medium of a wireless communication system for a radar allocation, wherein the radar allocation is determined by a slot configuration for a radio frame of the wireless communication system, wherein the slot configuration comprises one or more slots or symbols dedicated for the radar allocation; and
transmitting resource allocation information indicating the radar allocation, wherein the resource allocation information is transmitted to a wireless device in a broadcast system information message, a dedicated configuration message, blank resource signaling, and a downlink control information message, wherein the radar allocation is associated with one or more restrictions comprising a transmission power limitation, a restriction for spatial directions, and a use of allocated frequencies,
wherein the blank resource signaling includes a RateMatchpattern signaling on a Physical Dedicated Shred Channel (PDSCH), wherein the dedicated configuration message includes a Radio Resource Control Protocol (RRC) message or a Medium Access Control message (MAC), wherein the downlink control message is Downlink Control Information (DCI) carried on a Physical Downlink Control Channel (PDCCH),
wherein the slot configuration supports distribution of sensing time of radar signals during the radar allocation between the wireless device and the wireless communication system, wherein the slot configuration comprises slots or symbols dedicated for a sounding operation, wherein the radar allocation comprises more than one gap in a communication allocation on the wireless medium, and
wherein the more than one gap in the communication allocation is to be free from communications of the wireless communication system and the more than one gap identifies a resource of the wireless medium to be used for a radar operation.

* * * * *